Figure 1:
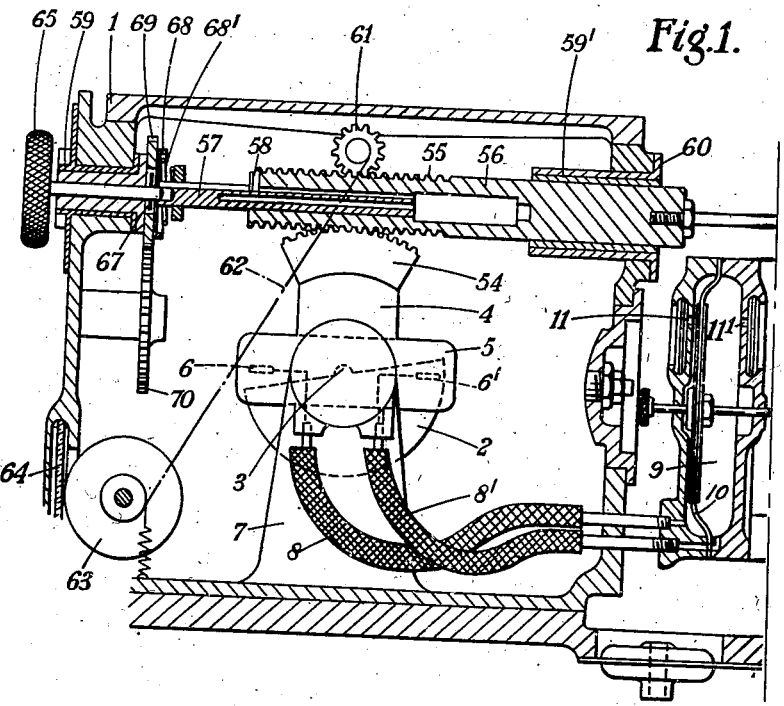

Dec. 4, 1945.   R. H. NISBET ET AL   2,390,119
CONTROL OR REGULATING SYSTEM EMPLOYING FLUID PRESSURE
Filed Oct. 2, 1941   3 Sheets-Sheet 1

INVENTORS,
R. H. NISBET
and W. G. HARDING,
By
Herbert H. Thompson
THEIR ATTORNEY

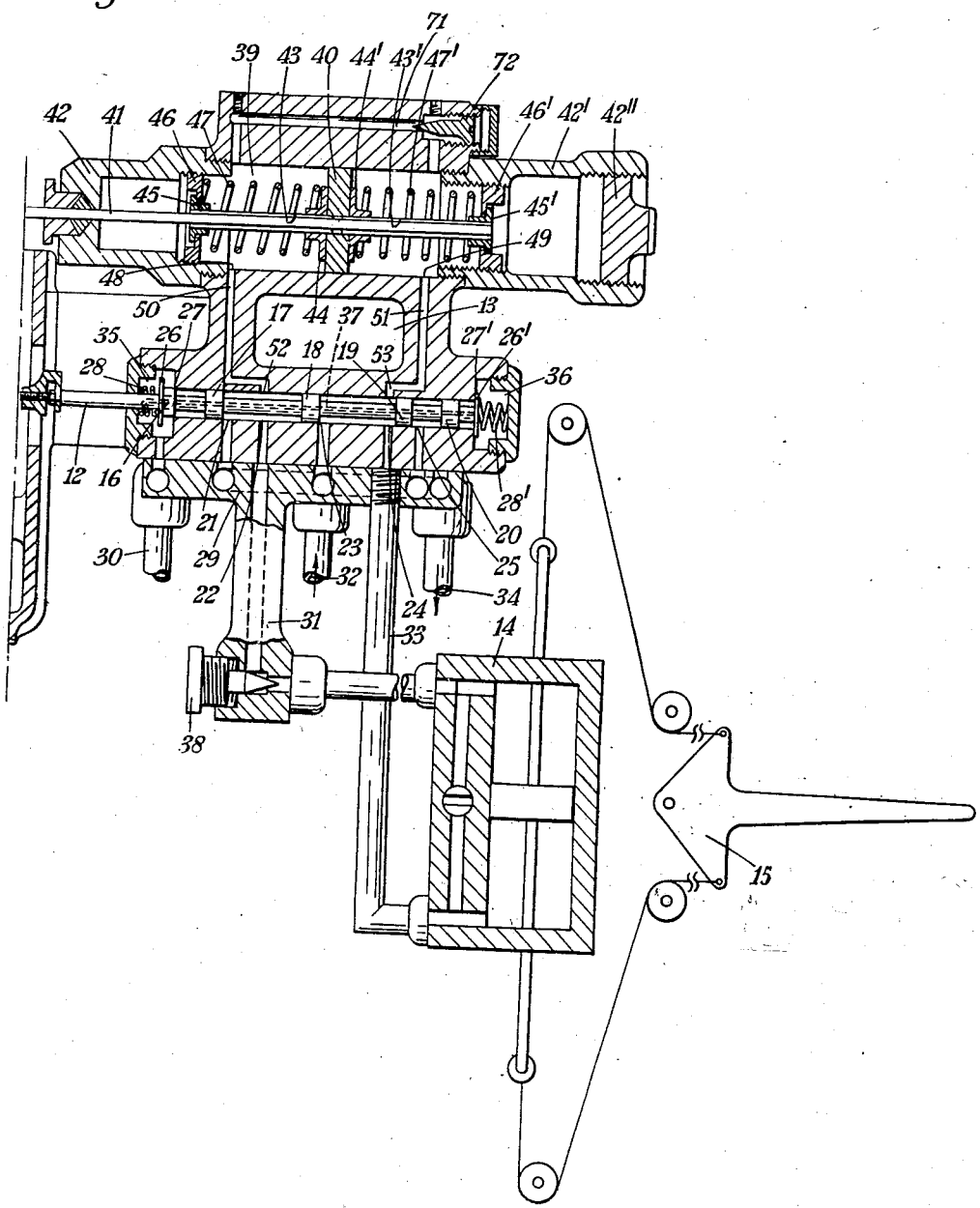

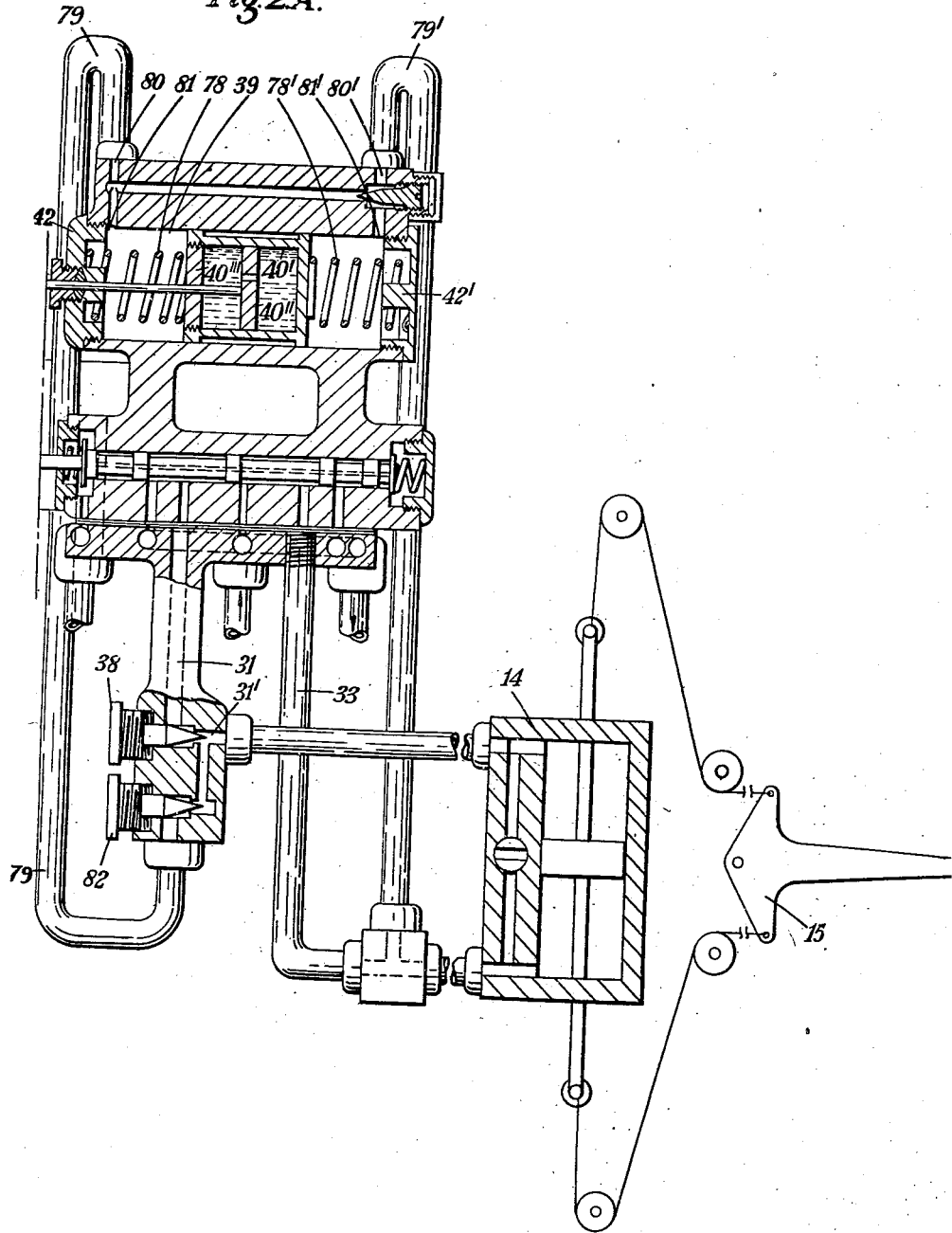

Patented Dec. 4, 1945

2,390,119

UNITED STATES PATENT OFFICE 2,390,119

CONTROL OR REGULATING SYSTEM EMPLOYING FLUID PRESSURE

Robert Hayes Nisbet, Stroud, and William George Harding, Whitton, England, assignors to Sperry Gyroscope Company Incorporated, Brooklyn, N. Y., a corporation of New York Application October 2, 1941, Serial No. 413,317 In Great Britain December 23, 1940

2 Claims. (Cl. 244—78)

This invention relates to control and regulating systems of the kind in which a primary controller controls a fluid pressure servo-motor through a relay valve, and it is concerned with the provisions of means for exerting a return action, or repeat-back, on the control system in dependence on the operation of the servo-motor, to cut off further operation of the servo-motor. While the invention has wide application in various fields, one use to which it may be put is in an automatic pilot for dirigible craft, such as aircraft.

In known forms of automatic pilot for aircraft, control is exercised from a gyroscopic device (when the craft becomes displaced from a desired attitude) by means of a cut-off disc or shutter connected to the gyroscope, and movable in relation to apertures in a pick-off member, such movements resulting in the application of pneumatic pressure to a relay valve, which is thus moved and causes the transmission of a proportional hydraulic pressure to operate a servo-motor from which a control surface of the craft is thus moved to restore the craft to the desired attitude. Various proposals have previously been made to introduce a return action or repeat-back in such a system. In one proposal a pulley and wire arrangement between the servo-motor and the primary controller is designed to restore the latter to a neutral condition when the servo-motor is operated. Such an arrangement is inconvenient and has other disadvantages. In another proposal a repeat-back cylinder located in the vicinity of the relay valve is connected in the flow circuit of the pressure fluid returning from the servo-motor, so that a piston in this cylinder is moved proportionally to the movements of the servo-motor. This piston is connected to restore the primary controller to a neutral condition by moving the pick-off device to follow the cut-off disc. The repeat-back cylinder and piston in this system are therefore responsive to the flow of oil into and out of the servo-motor. Since the same total volume of fluid as moves into and out of the servo-motor has also to pass into and out of the repeat-back cylinder, the latter must be at least as large as the servo-motor; it must in fact be considerably larger than the servo-motor to allow for leakages. This renders the oil valve unit very bulky and adds considerably to the total weight of the equipment.

In yet another proposal a hydraulic pressure depending on the pressure applied to the servo-motor is caused to act on the relay valve to restore it towards its neutral condition. In this system there is no positive relation between the servo-motor movement (and consequently the movement of the control surface of the craft) on the one hand and the deviation of the craft from its desired attitude on the other, because the position of the control surface of the craft at which the relay is restored to its neutral position depends on the pneumatic pressure applied to the relay under the control of the primary controller, and this pressure depends on the relative angular movement of the pick-off device and the cut-off gyroscope in a somewhat uncertain manner.

The present invention consists in a control or regulating system comprising a primary controller adapted, upon displacement from a neutral condition, to actuate a relay valve or the like, from which a fluid pressure servo-motor is set into operation, and means which under the influence of the differential pressure applied to the servo-motor, restore the primary controller towards its neutral condition.

It is important to distinguish between a system operated by fluid flow and a system operated by fluid pressure. In the former the fluid path is closed by a member movable by and with the fluid, but always preventing a free passage of fluid. In a system operated by fluid pressure, on the other hand, free passage of fluid is possible and the system is operated by a difference of pressure between tappings at different points in the fluid path.

The invention provides a fluid-pressure control system having many advantages. The apparatus involved is compact and is easily installed; the system operates satisfactorily as a control for a hydraulic servo-motor with a hydraulically operated return action even if there are oil leakages and even if there is air present in the hydraulic fluid. This last property results from the fact that the action depends on the pressure of the fluid and not on the fluid flow. For this last reason also the invention is applicable to pneumatic control as readily as to hydraulic control.

Figure 2:
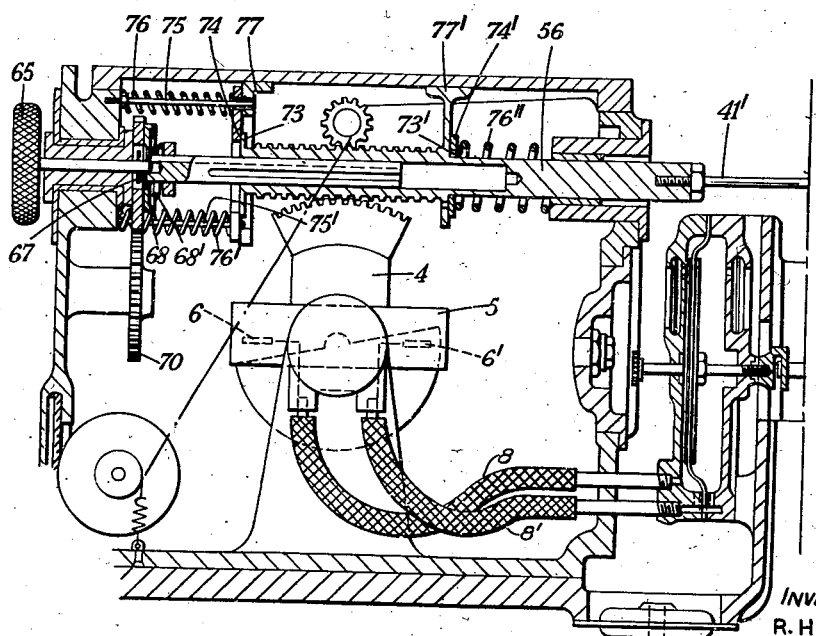

The invention, which is applicable to a wide variety of control and regulating systems, will be clearly understood from the following description of forms (given, however, merely by way of example) which it may assume when applied to the automatic control of an aircraft from a gyro-horizon. This description will be more readily followed by reference to the accompanying drawings in which:

Figures 1 and 1A taken together show a schematic view, largely in section, of an automatic control system for aircraft embodying the invention; and Figures 2 and 2A taken together show a schematic view, largely in section, of a modification, embodying the invention, of the system shown in Figures 1 and 1A in which the repeat-back or return action is effected through a yielding connection to the primary controller, which is spring centralised. These figures also include some modifications which may be used in the connections by which hydraulic pressure is applied to produce the repeat-back movement.

Referring to the drawings, representing the invention applied in one convenient manner to the gyro-horizon control unit 1 of an automatic pilot for aircraft, the unit comprises an air-spun gyroscope (not shown) spinning about a vertical axis in a rotor case (not shown). The rotor case is linked to a semi-circular cut-off disc 2, mounted for pivotal movement in the instrument case about the axis 3, in such manner that this disc is stabilised against pitching of the craft. There is also provided in the instrument case of the gyro-horizon 1 a follow-up frame 4, also mounted for rotational movement about the axis 3, and provided with a machined face 5 closely adjacent to the disc 2. The follow-up member 4 constitutes the pick-off device for the gyroscope, and cooperates with the disc 2 to form the primary controller for controlling the elevator of the craft.

For this purpose two ports 6, 6' are formed in the face 5 of the member 4, communicating with channels in the follow-up frame 4 and thence with channels in the bearing support 7 for the axis 3, and thereby with the pipes 8, 8', the channels being so formed that communication is maintained even if the follow-up member 4 is turned about the axis 3. The pipes 8, 8' lead into a diaphragm chamber 9 on opposite sides of the diaphragm 10, and thence are in communication with the atmosphere through restricted ports 11, 11'. The interior of the casing of the gyro-horizon 1 is maintained at a reduced pressure, atmospheric air therefrore being sucked in through the ports 11, 11' into the diaphragm chamber 9, and thence by pipes 8, 8' to the ports 6, 6'. Normally the ports 6, 6' are both partly covered to substantially equal extents by the cut-off disc 2, but, if the aircraft pitches relatively to the disc 2, one of the ports 6, 6' becomes uncovered and the other covered, to a greater extent than normal. In Figure 1 port 6 is shown as uncovered and port 6' as covered, whereby the air-pressure in the left hand side of the chamber 9 is lowered towards that of the interior of the gyro-horizon 1, and the pressure in the right hand raised towards that of the atmosphere, so that the diaphragm is forced to the left. The diaphragm 10 is linked to the piston rod 12 of the relay valve 13 controlling the elevator servo-motor 14 which is connected to operate the elevator 15. In this way the gyroscope and its pick-device constitute a primary controller 2, 5, 6, 6' for exerting control of the craft through the relay valve 13. A full description of the parts so far referred to is to be found in more detail in British Patent Specification No. 416,813.

When, as shown in Figure 1A, the diaphragm 10 and the piston rod are displaced to the left, the pistons 17, 18, 19 uncover the ports 21, 23, 25 respectively, and piston 16 lifts the washer 26 off its seating 27 against the resistance of the spring 28. This spring in combination with the complementary spring 28', washer 26', seating 27', and piston 20, thus act as a centralising arrangement to restore the valve rod 12 and diaphragm 10 to their normal position in which the pistons 17, 18, 19 cover the ports 21, 23, 25. Ports 21 and 25 are connected, by way of the channel 29, to the pipe 34. Port 22 is connected to pipe 31, port 23 to pipe 32, and port 24 to pipe 33. A pump (not shown) delivers oil under pressure to pipe 32, the oil being obtained from a reservoir or sump (not shown) to which it is returned through pipe 34. The pipes 31 and 33 lead to the opposite ends of the hydraulic servo-motor 14, pipe 31 being provided with a needle valve 38 by which the rate of flow of oil to or from the servo-motor may be controlled.

The chambers 35, 36 at the ends of the valve, in which are located the springs 28, 28', are interconnected by the passage 37 through the piston rod 12. The drain pipe 30 leading from chamber 35 is thus also in communication with chamber 36 so that oil leaking past either of the pistons 16, 20 may drain away through it.

The operation of the parts so far described is as follows. If the craft pitches upwards, the disc 2 takes up a position relative to the follow-up member similar to that shown in Figure 1, so that port 6 is uncovered and port 6' covered. The diaphragm 10 is forced to the left taking with it the valve rod 12 whereby ports 21 and 22 are put into communication with each other through the space between the pistons 17 and 18, and ports 23 and 24 are put into communication with each other through the space between pistons 18 and 19. Oil flows in from the pump through pipe 32 by way of ports 23 and 24 into the lower end of the servo-motor 14 causing the piston to move upwards. The oil in the upper end of the servo-motor 14 is expelled through the pipe 31, ports 22 and 21, channel 29, and pipe 34 to the sump. The movement of the piston of the servo-motor 14 causes the elevator 15 to be deflected downwards thereby causing a force to be applied to the craft to correct the pitch. When the craft pitches downwards, the valve rod 12 is displaced in the opposite direction, port 23 is put into communication with port 22, and port 24 with port 25, so that the servo-motor 14 and the elevator 15 are operated in the opposite sense.

In order that the servo-motor 14 shall not move too far, it is necessary to provide means by which movement of the servo-motor shuts off the valve 12, 13. The present invention provides simple and convenient means for bringing about this result.

In carrying the invention into effect in one convenient manner there is provided in the vicinity of the valve 13 (and preferably forming part of the same unit as the valve) a repeat-back cylinder 39 containing a piston 40 secured to a piston rod 41. The cylinder is provided with two elongated end caps 42, 42' and the piston rod passes through a closely fitting hole in the end cap 42. Loosely fitting on the piston rod 41 are two sleeves 43, 43' having large flanges 44, 44' on the inner ends (adjacent to the piston 40) and smaller flanges 45, 45' on the outer ends. The elongated end caps 42, 42' are bored to permit the flanged end 45 to move to the left (as seen in Figure 1) in the bore of cap 42 and the flanged end 45' to move to the right in the bore of cap 42' for a distance equal to the desired stroke of the piston 40. The movement of the sleeve 43 to the right, (as seen in Figure 1A) when the piston 40 is moved to the right, is limited by the engagement of the flange 45 with a shouldered nut 46 which is secrewed into the end cap 42. Similarly the movement of the sleeve 43' to the left is limited by the engagement of the flange 45' with the shouldered nut 46'. Compression coil springs 47, 47' act between the nut 46 and the flanged end 44 of the sleeve 43 and between the nut 46' and the flanged end 44' of the sleeve 43', thus keeping these sleeves forced axially inwards towards the piston 40. The nuts 46, 46' are adjusted and fixed in position so that when both the sleeves 43, 43' are forced by the springs 47, 47' towards each other until the flanges 45, 45' abut against the nuts 46, 46', the spacing between the flanges 44, 44' is equal to the thickness of the piston 40. Figure 1A shows the piston 40 central with the nuts 46, 46' correctly adjusted. To facilitate the adjustments referred to the end cap 42' may itself be provided with a removable screw cap 42'', removal of which renders the nut 46' accessible.

If the piston 40 is moved to the right from the position shown in Figure 1, the spring 47' is compressed further but the spring 47 does not extend, as the sleeve 43 can move no farther to the right. In movement to the right the piston therefore experiences the full restoring force of the spring 47'. The magnitude of this restoring force during the initial movement of the piston is dependent on the initial compression of the spring. This initial compression is made of such value as to ensure that the initial restoring force is sufficient to move the piston 40 and the parts operated by the piston rod 41 against whatever friction they experience. However, all these parts are designed to keep such friction as low as possible (in particular the piston 40 is an easy fit in the cylinder 39), so that the springs 47, 47' need only have a slight initial compression and yet will centralise the piston 40 against friction in the absence of a force causing a displacement.

The two ends of the cylinder 39 are in communication by way of the ports 48, 49 and channels 50, 51 with the pipes 31, 33 leading to the servo-motor 14. As shown, such communication is ensured by connecting the channels 50, 51 to ports 52, 53 in the same portions of the cylinder of valve 13 as those containing the ports 22, 24. As a result, the difference of pressure effective in the servo-motor is also effective in the two halves of the cylinder 39, and the piston 40 and piston rod 41 are displaced against the springs 47, 47' through a distance proportional to this difference of pressure. The follow-up frame 4 of the gyroscope is operated from the piston rod 41 in the following manner:

The follow-up frame 4 for the gyroscope is provided with a gear segment 54, which meshes with a worm 55 cut on a hollow shaft 56. This worm is axially slidable on the inner co-axial shaft 57, to which it is splined by the pin and slot means 58, so that the shafts 56 and 57 turn together in bearings 59, 59'. Bearing 59 is located in the front wall of the instrument case 1 while bearing 59' is located in a bushing 60 secured in the rear wall.

The gyroscopic unit 1 and the unit comprising the oil valve 13, the repeat-back cylinder 39, and the diaphragm chamber 9, are, as shown in Figures 1 and 1A, rigidly connected, the repeat-back cylinder 39 and the bearings 59, 59' being coaxial. In this construction the shaft 56 is rigid with the piston rod 41, so that movement of the piston rod causes axial sliding of the shaft 56 along the inner shaft 57.

In operation, if the craft pitches so that the disc 2 controlled by the gyroscope and the pick-off device 4, 5, 6, 6' take up a relative position as shown in Figure 1, the valve 12, 13 is operated as already explained so that pressure fluid is supplied to the servomotor to actuate the elevator. As the elevator is moved, air resistance develops, which causes a difference of pressure to develop in the pipes 31, 33. This difference of pressure is applied by way of the channels 50, 51 to the piston 40, resulting in a movement of the piston to the left through a distance determined by this difference of pressure and by the characteristics of the restoring springs 47, 47'. The shaft 56 takes part in this movement and its movement in turn causes the gear sector 54 to turn about the axis 3 thereby moving the follow-up member 5, 6, 6' of the primary controller to follow-up the disc 2 so that the primary controller is restored towards the neutral condition in which the ports 6, 6' are aligned with the edge of the disc 2.

In order to provide an indication of the position of the follow-up member 4, the worm 55 is arranged to mesh not only with the gear segment 54 but also with the pinion 61 the hub of which is connected by a flexible band 62 to the hub of a drum 63 which carries indications visible in window 64.

A manual control knob 65 is provided on the front of the instrument case to enable the automatic pilot to be set in order to effect a climb or descent of the craft. When this knob is pushed inwards its stem enters further into shaft 57, and a cross-pin 67 carried by it engages in a recess in the end of this shaft and at the same time forces clutch plate 68, which is splined on shaft 57, to disengage from the normally stationary gear 69. In this condition rotation of the knob 65 causes shaft 57, and with it worm 55, to rotate. Worm 55 is held axially by the pressure and spring forces operating on the piston 40, and its rotation therefore causes gear sector 54 and pinion 64 to rotate. The position of the pick-off device 4, 5, 6, 6' at the gyroscope is thus altered whereby the automatic pilot thereafter controls the craft to that new angle of climb or descent in which the pick-off device is once again in alignment with the disc 2. Spring 68' returns clutch plate 68 into engagement with gear 69 when the manual control knob 65 is released.

A barometric control device may be added by arranging that it operates by turning the gear 70 meshing with the gear 69, so that the angle of climb or descent is altered to bring the craft to, or maintain it at, a desired height.

It will be clear that, even if there is leakage past the piston 40, a pressure difference is still maintained between the two sides of the cylinder 39 proportional to the pressure-difference in the servo-motor. Thus leakages are not detrimental to the operation of the system if they are not too heavy. This fact enables the piston 40 to be made an easy fit in the cylinder 39, and this, together with the continuous lubrication present, allows friction to be kept to a very low value. The fact that leakage is not detrimental may be used to furnish an adjustment to the apparatus, as will now be described.

A by-pass passage 71 is provided interconnecting the two ends of the repeat-back cylinder 39, and an adjustable needle valve 72 is provided therein. By adjusting this valve the resistance to the flow of fluid by-passing the piston 40 may be adjusted in relation to the resistances to flow in the channels 50 and 51, and in this way a greater or smaller fraction of the difference of pressure effective in the servo-motor 14 may be made effective in the repeat-back cylinder 39. This provides what is in effect an adjustment of the "rudder ratio" i. e. of the extent to which the elevator is moved by the automatic pilot in response to a given deflection of the craft from its normal attitude.

In a modified arrangement of the invention shown in Figures 2 and 2A the piston 40' (which corresponds to the piston 40 of Figure 1) is a shuttle piston, and its connection to the shaft 56 is not rigid as in Figure 1, but is a yielding connection. The piston 40' is hollow, the hollow interior itself acting as a cylinder for an inner portion 40'', to which is attached the piston rod 41' which passes through the end cap 40''' of the hollow piston 40' and through the end cap 42 of the cylinder 39 for connection to the shaft 56. The interior of the piston 40' is filled with the same fluid as is used in the cylinder 39, and the clearances round the inner piston 40'' are made so small that this fluid can pass from one side of the piston to the other only very slowly under the forces to which it is subjected in practice. Subject to this requirement, which will be defined more precisely below, the inner piston 40'' is designed to move as freely as possible i. e. with as little friction as possible, in the bore of piston 40'. In this arrangement the pick-off device 4 at the gyroscope is itself spring-centralised independently of the piston by the following arrangement:

The shaft 56 is provided with a flange 73 at one end and with a shoulder 73' at the other end; these engage respectively with loose collars 74, 74'. Collar 74 is guided on pins, of which only two, 75, 75' are visible in Figure 2, and compression springs, such as 76, 76', act between the collar 74 and the casing to press the collar to the right until it abuts against the stop 77, which surrounds the shaft 56. The other collar 74' is forced to the left by the compression spring 76'' until it abuts against the stop 77', which surrounds the shaft 56. The parts are so dimensioned that, when the shaft 56 is central the collars 74, 74' rest against the stops 77, 77'. Slight movement of the shaft in either direction causes the flange 73 or the shoulder 73' to lift the corresponding collar 74 or 74' from its stop 77 or 77' against the return force exerted by the compression springs 76, 76' or 76''.

It should be noted that, if the attitude set for the craft is altered by turning knob 65, the centralising springs 76, 76' or 76'' centralise the pick-off 5 to the new position, since the alteration of the attitude is made by altering the relation between the longitudinal position of the shaft 56 and the position of the pick-off device 4.

It can readily be seen that, if the piston 40' is displaced, taking with it the piston 40'', and shaft 56, and causing the pick-off 4 to turn, the springs 76, 76' (or spring 76'') are thereby compressed and exert a restoring force on the shaft 56, which slowly displaces the piston 40'' inside the piston 40'. The restoring force exerted by the springs 76, 76' (or spring 76'') when the collar 74 (or 74') is just raised from its stop 77 (or 77') is sufficient to overcome any friction in the parts moving with the shaft 56, and the dashpot formed by the pinion 40' and the interior of piston 40' yield slowly under the force applied to it by the centralising springs. The yielding or subsidence period of this arrangement should be at least of the order of, and preferably considerably longer than, the period of a complete oscillation of the craft in the shorter of its periods of oscillation. The control system of Figure 2 thus behaves substantially in the same manner as that of Figure 1 during fluctuating disturbances to the equilibrium of the craft, but, if a long continued disturbing condition is in operation, e. g. if the craft is out of trim, the inner piston 40'' slowly becomes displaced in the piston 40', so that the length of the repeat-back connection from piston 40' to the worm 55 is altered to compensate for the out-of-trim condition.

This arrangement is an example of the use of a slowly yielding member in the repeat-back connection, which is a feature of the present invention. In the form of the invention being described the yield takes place between the piston rod 41' and the cylinder 40' of a dash-pot. Such arrangements usually give rise to difficulties in preventing leakage of fluid, but the expedient adopted in Figure 2 of using the cylinder 40' of the dash-pot itself as the piston in another cylinder 39 overcomes these difficulties and also makes the whole apparatus compact.

In Figure 2 the centralising arrangements for the piston 40' are simpler than those for the piston 40 of Figure 1. They consist of two simple opposed compression springs 78, 78', acting directly between the piston 40' and the end caps 42, 42' of the cylinder 39. This arrangement does not give such precise centering, independent of friction, secular changes in the springs, and so on, as does the arrangement of Figure 1, but this fact is not of importance in view of the existence of the independent centralising arrangements for the shaft 56.

Figure 2 also illustrates a number of modifications of the arrangements shown in Figure 1 for applying hydraulic pressure to the piston 40'. These modifications are not essentially connected with the use of the yielding connection of Figure 2 between the piston 40' and the pick-off device 4, and they may, if desired, be imported directly into the system of Figure 1. The channels 50, 51 in the valve casing 13 of Figure 1 are replaced by pipe connections 79, 79' which are connected on the one hand to channels 80, 80' leading to ports 81, 81' in the cylinder 39, and on the other hand to the pipes 31, 32. Moreover, the connection of pipe 79 to pipe 31 is made to the section 31' of the pipe on the servo-motor side of the needle valve 38, so that the pressure difference applied to the piston 40' corresponds to that developed in the servo-motor 14 and is unaffected by the adjustment of the valve 38.

In Figure 2 an adjustable restriction is introduced in the flow path to or from the cylinder 39 in the form of an adjustable needle valve 82, which is arranged side by side with the needle valve 38, and serving to restrict the flow of fluid from pipe 31' to pipe 79. The piston 40' therefore moves slowly in response to pressures developed in the servo-motor 14, and its motions during a cycle of operations of the servo-motor lag behind those of the servo-motor. The valve 82 is adjusted so that this time lag is a fraction of the period of a natural oscillation of the craft in the shorter of its two periods of oscillation. The result is that the pick-off device 4, does not follow the gyroscope-controlled disc 2 as quickly as it would otherwise do. As a consequence, if the attitude of the craft is disturbed, e. g. by a gust of wind, and the automatic pilot applies the elevator to correct the attitude, more elevator is applied during the departure of the craft from the correct attitude than is applied when a proportional type of repeat-back is used, and less elevator is applied (and possibly even reverse or checking elevator) during the return of the craft to the correct attitude. This is a very desirable condition, as it results in disturbances subsiding without oscillation.

It should be understood that various modifications may be employed to carry the invention into effect. Instead of using a piston, e. g. 40, sliding in a cylinder, e. g. 39, as the means responsive to the pressure in the servo-motor, a spring centralised bellows device may be used, or a corrugated metal bellows (which provides its own centralising forces). Alternatively in place of the piston and cylinder 40 and 39 there may be employed a vane-motor in which a cylindrical casing provided with radial vanes extending inwards towards the centre contains a rotary member provided with outwardly directed radial vanes forming a number of chambers such that application of a difference of pressure to two or more of such chambers, causes the rotary member to rotate against a spring. Further, as the pressure-responsive device employed in the invention, any other type of fluid rotary motor turning against a spring, may be utilized. It is to be understood that these and other modifications, which become desirable in order to carry the invention into effect under different conditions and requirements which have to be fulfilled, may be employed without departing from the scope of the invention.

What we claim is:

1. In an automatic pilot for aircraft, the combination with a rudder and a hydraulic servo motor therefor, a position maintaining means, a dually controlled pneumatic controller having a primary and a follow-back control producing a signal upon displacement of said controller, the primary control thereof being from said position maintaining means, a pneumatically controlled hydraulic relay valve actuated from said signal admitting throttled hydraulic pressure to said servo motor, a pressure repeat-back device connected to the follow-back control of said controller and constituting the sole follow-back between the servo and said controller, said repeat-back device comprising a spring centralized servo connected hydraulically to said relay valve in parallel with said main servo, whereby a pressure is produced in said main servo substantially proportional to the primary displacement of the controller.

2. Object controlling means of the character claimed in claim 1, in which said follow-back device is formed by a closed cylinder having a spring centralized, fluid containing, hollow shuttle piston and a second piston within said hollow piston, said second piston being connected to said follow-back control of said controller.

ROBERT HAYES NISBET.
WILLIAM GEORGE HARDING.